United States Patent [19]

Swinderman

[11] Patent Number: 5,048,669
[45] Date of Patent: Sep. 17, 1991

[54] MODULAR CONVEYOR BELT SEALING SYSTEM

[75] Inventor: Robert T. Swinderman, Kewanee, Ill.

[73] Assignee: Martin Engineering Company, Neponset, Ill.

[21] Appl. No.: 492,610

[22] Filed: Mar. 13, 1990

[51] Int. Cl.$^5$ .............................................. B65G 47/19
[52] U.S. Cl. .................................. 198/525; 198/836.1
[58] Field of Search .............................. 198/525, 836.1

[56] References Cited

U.S. PATENT DOCUMENTS

| | | |
|---|---|---|
| 2,704,149 | 3/1955 | Huey . |
| 2,883,035 | 4/1959 | Erisman .............................. 198/525 |
| 2,983,362 | 5/1961 | Crist . |
| 3,400,805 | 9/1968 | Thompson . |
| 3,499,523 | 3/1970 | Clegg . |
| 4,140,217 | 2/1979 | Dell . |
| 4,204,595 | 5/1980 | Marrs . |
| 4,231,471 | 11/1980 | Gordon . |
| 4,236,628 | 12/1980 | Stahura . |
| 4,414,252 | 11/1983 | Lampkin . |
| 4,418,261 | 11/1983 | Jailor et al. . |
| 4,641,745 | 2/1987 | Skates .............................. 198/836.1 |
| 4,874,082 | 10/1989 | Swinderman .................... 198/836.1 |
| 4,877,125 | 10/1989 | Gordon . |

FOREIGN PATENT DOCUMENTS

| | | |
|---|---|---|
| 2852524 | 6/1980 | Fed. Rep. of Germany ... 198/836.1 |
| 933810 | 8/1963 | United Kingdom ............. 198/836.1 |

Primary Examiner—Joseph E. Valenza
Attorney, Agent, or Firm—Lee, Mann, Smith, McWilliams & Sweeney

[57] ABSTRACT

A modular conveyor belt sealing system is provided including a plurality of modular units, each unit including a lightweight frame and one or more wear liners removably fastened to the interior of each frame. The modules are removably positioned adjacent each edge of the conveyor belt. The modules extend along each edge of the conveyor belt as desired and are removably fastened in place and to one another end to end. Each module is of equal length and may include different interior configurations of straight, inwardly deflecting or outwardly deflecting wear liners. Each module may additionally include an inner liner attached to the interior of the frame between the frame and the wear liner, with the wear liner spaced apart from the inner liner, defining a passageway therebetween and extending from the bottom of the module at the conveyor belt edge to the top of the module. Each module is independently removable from and replaceable on the conveyor belt system from the exterior of the system and each modular unit is interchangeable with one another. One or more adjustable stiffeners may be attached to the exterior of each modular unit to provide added rigidity and to aid in alignment of the wear surfaces. The wear liners of each module are also removable from and replaceable on the frames of the modular units.

18 Claims, 4 Drawing Sheets

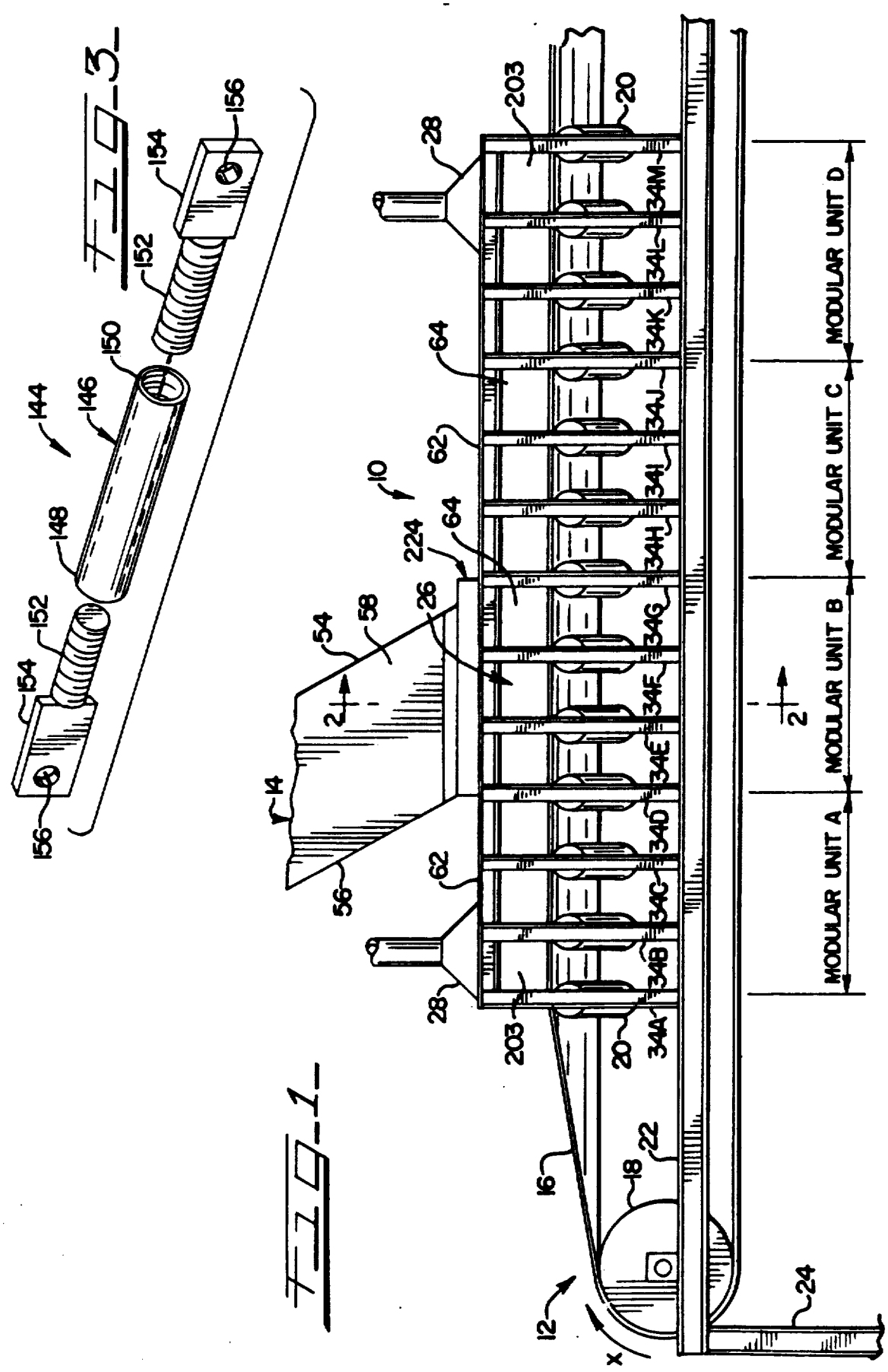

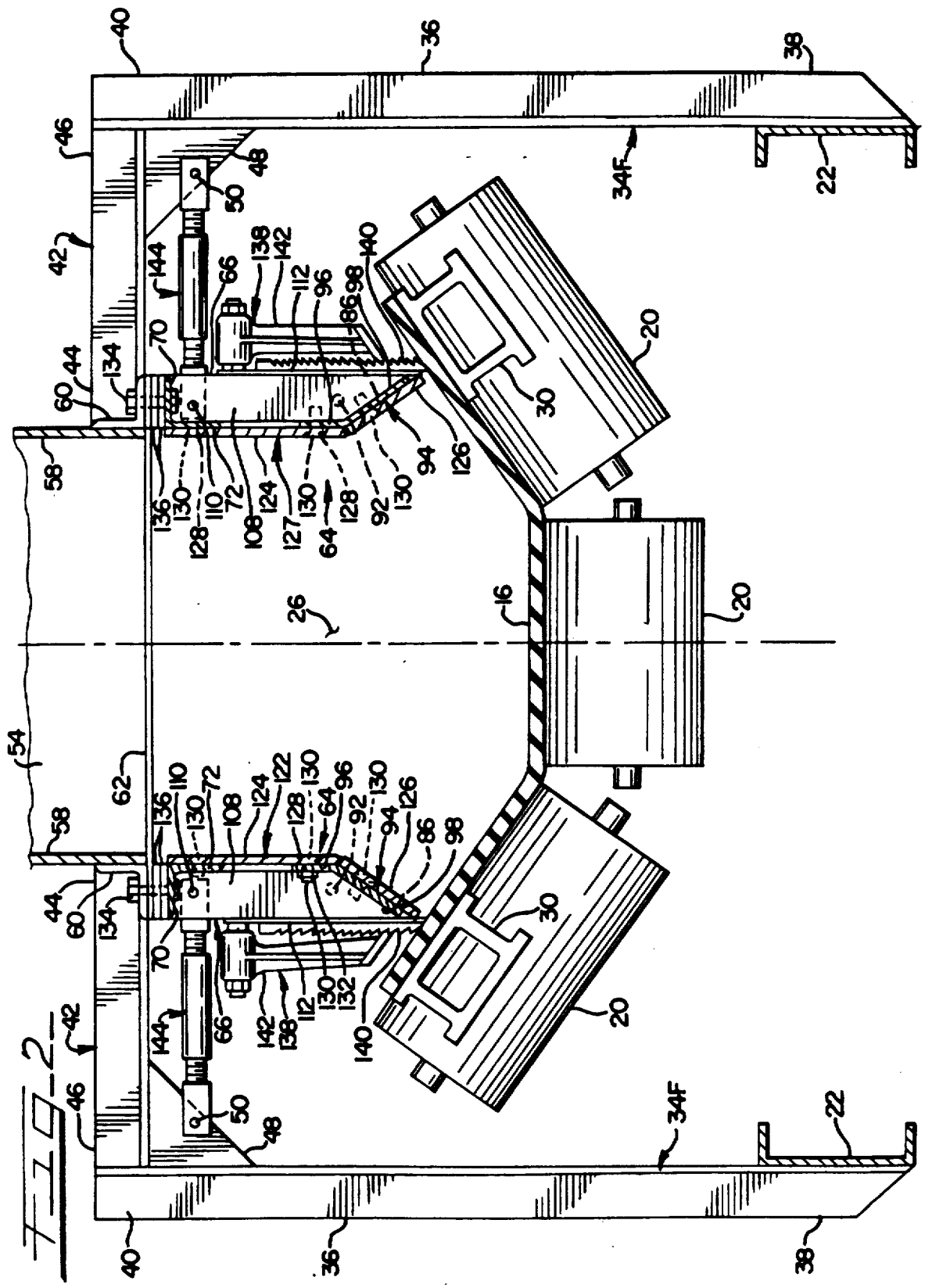

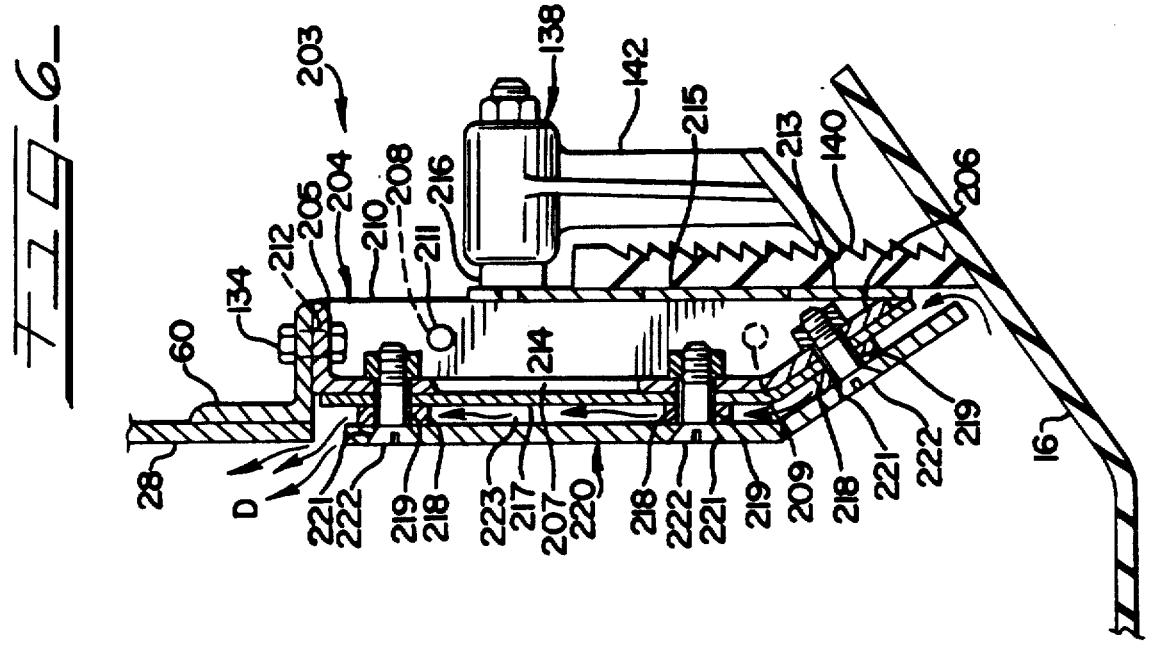
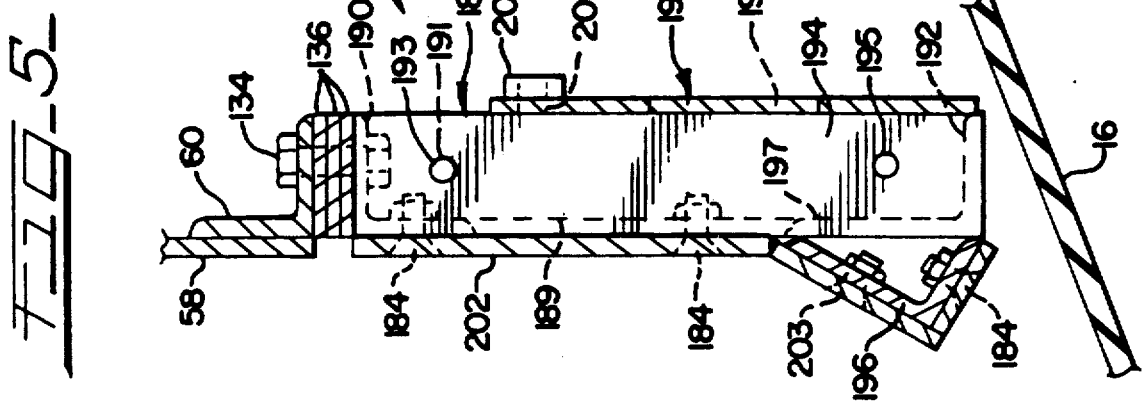
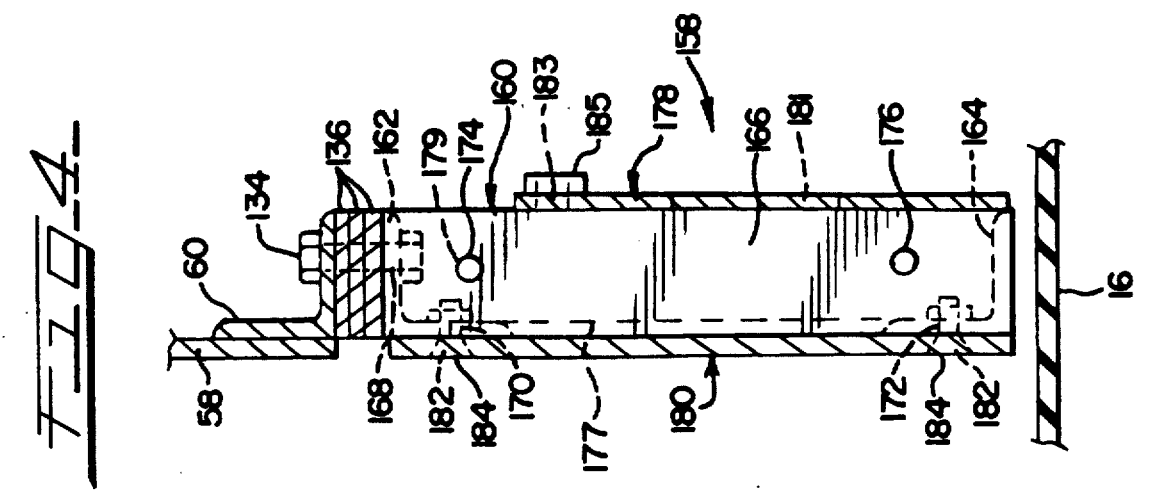

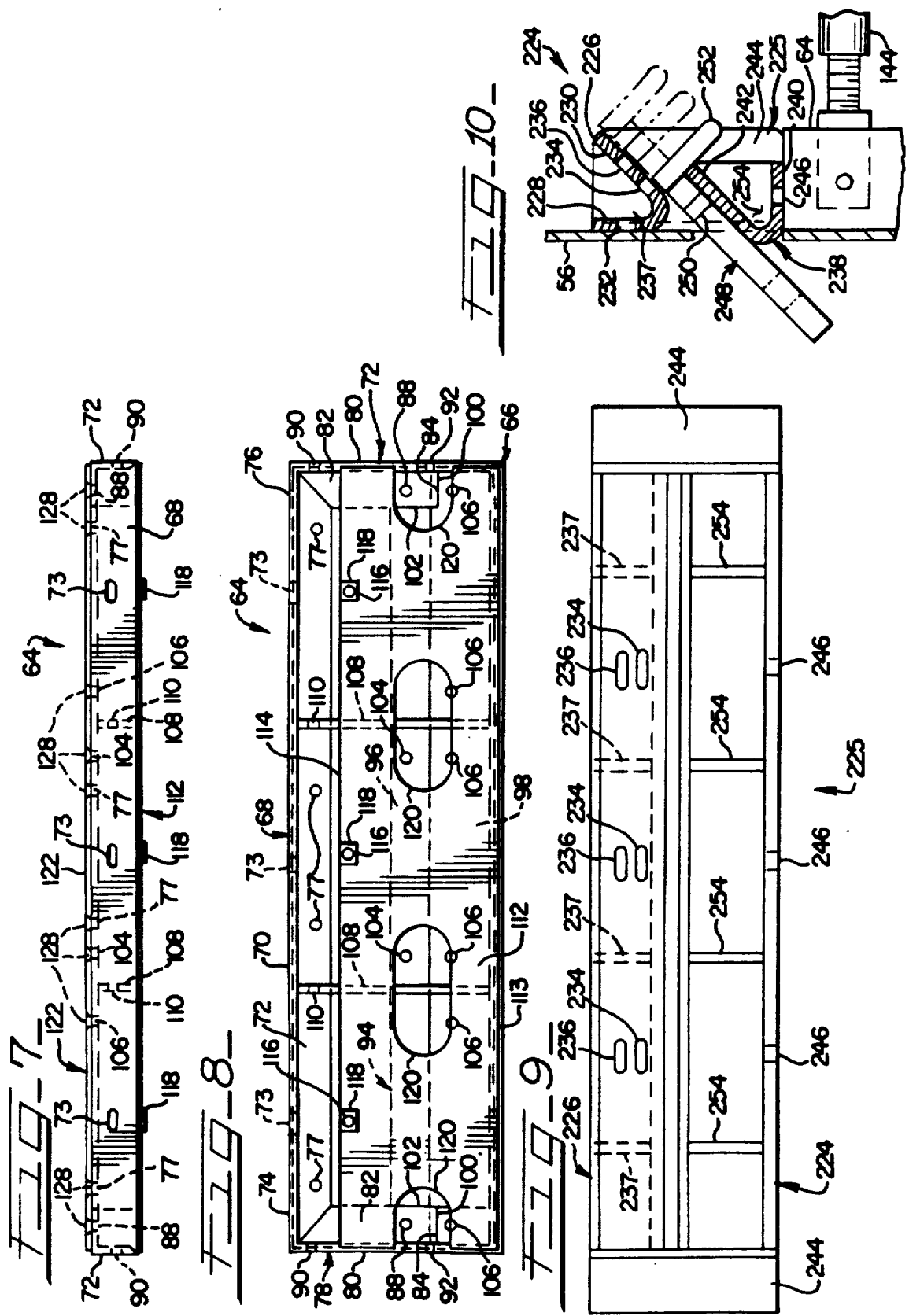

MODULAR CONVEYOR BELT SEALING SYSTEM

BACKGROUND OF THE INVENTION

The present invention relates to conveyor belt sealing systems which are used to seal against the escape of bulk materials, such as sand, gravel or coal, which are being loaded upon a conveyor belt and to retain the material on the belt, preventing leakage. Such sealing systems are often used at transfer points between the end of one conveyor and the start of a second conveyor. Transfer points are found in such places as where the direction in which the material is being conveyed must be changed, where material from a main feed conveyor is emptied into a series of chutes and gates which may redirect the material onto one or more of a number of different conveyors, or where the conveyed material is taken through a processing step such as through a coal crusher.

As the conveyed material is loaded upon a conveyor belt, the material will sometimes overflow the edges of the belt causing large piles of the conveyed material to accumulate around the conveyor mechanism. Leakage from a conveyor belt requires expensive maintenance and clean up work in removing this fugitive material. Transfer points having permanently positioned conveyor belt skirts along the edges of a conveyor belt have been utilized to retain the conveyed material on the belt and to prevent transfer point leakage. Examples of such arrangements are illustrated in U.S. Pat. Nos. 4,236,628 and 4,874,082.

Such conveyor belt skirts are in contact with the conveyed material as the material is loaded onto the belt and as the material is conveyed along the belt. Due to the often abrasive qualities of the conveyed material, the inner surfaces of the conveyor belt skirts are exposed to extreme amounts of wear. Conveyor belt skirts are therefore normally lined with a wear resistant liner such as T-1 steel or ultra-high molecular weight plastic. These wear liners are usually attached to the interior of the skirts with countersunk bolts or by tack welding. When a wear resistant liner requires replacement, the conveyor must be shut down and the worn wear plates are individually removed from the conveyor belt skirts by a person working on the inside of a chute or within the transfer point. New wear plates are then bolted or welded in place from the inside of the transfer point. A person must work from the interior of the chute or transfer point in a small, dark and inconvenient area while replacing the wear plates. This often leads to long conveyor belt down times and to poor workmanship. The accuracy with which the wear resistant materials are replaced is impeded which leads to leakage of the conveyed material from the transfer point.

The stream of conveyed material which is being loaded onto a conveyor from another conveyor belt or from a chute is often not centered on the center line of the receiving conveyor belt. This causes the conveyed material to pile up on one side or the other of the receiving belt resulting in uneven belt loading conditions which causes unnecessary wear to the conveyor mechanism. Conveyor belt skirts can help redirect the stream of conveyed material back to the center line of the receiving conveyor. However, the repositioning of the stream of conveyed material causes extreme wear on the wear plates, requiring more frequent replacement of wear plates and further conveyor belt down time and wear plate misalignment.

As the conveyed material is transferred onto a conveyor, the material often falls from a substantial height above the conveyor belt. The conveyed material will impact the conveyor belt with a large force creating considerable amounts of dust. A dust collection system is often provided above the conveyor belt at points ahead of and after the zone where the conveyed material is loaded. The conveyor belt skirts help to seal this dust within the transfer point so that the dust can be collected by the dust collectors.

The problem of dust production is most acute at the conveyor belt surface as most of the dust is generated at the interface between the conveyor belt surface and the conveyed material. The dust which is created at the conveyor belt surface often becomes trapped from escaping upwardly by the continual downward flow of the conveyed material from above and from a seal which is created between the wear liner of the conveyor belt skirt and the conveyed material above the belt which is in contact with the skirt. This creates an area of positive pressure at the belt edge which tries to force the dust out of the transfer point between the edge of the conveyor belt and the conveyor belt skirt. The gap between the lower edge of the transfer point skirt and the edge of the conveyor belt is often a quarter of an inch. Maintaining a close tolerance on this gap is important to retaining the conveyed material and the dust which is produced from the loading.

SUMMARY OF THE INVENTION

The present invention provides a modular conveyor belt sealing system for preventing the leakage of conveyed material and dust from a conveyor belt. The sealing system is provided with a plurality of modular units with each unit including a lightweight frame and one or more wear liners attached to the interior of the frame. Each unit is removably secured in place adjacent the edge of a conveyor belt and extends along an edge of the conveyor belt. A plurality of units may extend along each edge of the conveyor belt as desired removably fastened to one another end to end.

Each modular unit is of equal length and substantially equal height, however each modular unit may have different interior configurations of planar, inwardly deflecting or outwardly deflecting wear liners. Each modular unit is independently removable from and replaceable on the sealing system from the exterior of the sealing system. When the wear plates of a modular unit require replacement, this unit is removed and is quickly replaced with a second modular unit with a minimum amount of conveyor down time. Each modular unit is also interchangeable with one another so that different configurations of modular units may be used as desired.

Once a modular unit has been removed, its wear plates may be removed and new wear plates may be precisely fitted to the unit. The refurbished modular unit may then be used to replace the next modular unit which becomes worn. The replacement of the wear liners may be done in the shop as well as in the field and may be done at leisure as the conveyor mechanism is in operation. The precision fit of the modular units eliminates misaligned wear plates which can lead to leakage problems.

One or more adjustable stiffeners may be attached to each modular unit. The adjustable stiffeners provide rigidity to the modular units and aid in aligning the units and their wear liners to close tolerances.

A deflector mechanism may be attached to the conveyor chute between the chute and the modular units. The deflector mechanism includes an adjustable deflector plate which may be inserted into the interior of the chute, at approximately a 45° downward angle. The plate can be inserted into the flow path various distances as desired to redirect a stream of material to the centerline of the conveyor belt. When the deflector plate is worn beyond acceptable limits, the plate may simply be slid out of the deflector mechanism and a new deflector plate inserted.

Each modular unit may additionally be a ventilator module which includes an inner liner located between the frame and the wear liner, with the wear liner spaced apart from the inner liner so as to define a passageway therebetween which extends from the conveyor belt edge to the top of the module. One or more modular ventilator units may be provided where dust is found to be leaking from the transfer point between the conveyor belt skirt and the belt. Dust which is generated at the conveyor belt surface is forced up the passageway of the ventilator module and out the top of the ventilator module above the area where the conveyed material creates a seal with the transfer point skirt wear liner thereby alleviating the positive pressure area at the edge of the belt and allowing the dust collection system to remove the dust.

DESCRIPTION OF THE DRAWINGS

FIG. 1 is a side elevational view of the modular conveyor belt sealing system shown in connection with a conveyor mechanism having a dust pickup system and a feed chute.

FIG. 2 is a cross sectional view of the modular conveyor belt sealing system taken along lines 2—2 of FIG. 1 through the load zone of the conveyor belt.

FIG. 3 is an exploded view of the adjustable stiffener.

FIG. 4 is an end view of a modular unit having a planar wear liner.

FIG. 5 is an end view of a modular unit having an inwardly deflecting wear liner.

FIG. 6 is a cross sectional view of a modular ventilator unit having an outwardly deflecting wear liner.

FIG. 7 is a top plan view of the modular unit.

FIG. 8 is a side elevational view of the modular unit having an outwardly deflecting wear plate.

FIG. 9 is a side elevational view of the deflector mechanism frame.

FIG. 10 is a cross sectional view of the deflector mechanism showing various positions of the deflector plate.

DESCRIPTION OF THE PREFERRED EMBODIMENT

FIG. 1 shows a modular conveyor belt sealing system 10 in use with a conveyor mechanism 12 and a feed chute 14. The conveyor mechanism 12 includes a conveyor belt 16 which rotates about a tail pulley 18 and a head pulley (not shown). The conveyor belt 16 rotates in a direction as shown by the arrow X in FIG. 1. The conveyor belt 16 may also be capable of reversing its direction of rotation to a direction opposite that shown by the arrow X. The belt 16 is supported between the tail pulley 18 and the head pulley (not shown) by a series of idler rollers 20 which support the belt 16 in a trough-like configuration having a horizontal center section and upwardly sloping edges. The edges of the belt 16 are shown sloping upwardly at an approximate angle of 35° from horizontal. The idler rollers 20 are supported by any one of a number of commonly known means. The tail pulley 18, the head pulley (not shown) and the idlers 20 are all supported by stringers 22 which extend along each side of the conveyor mechanism 12. The stringers 22 are supported by posts 24.

The feed chute 14 directs a stream of conveyed material (not shown) onto the load zone 26 of the conveyor belt 16 which is below the feed chute 14. The conveyed material may include sand, gravel, coal, cement, asphalt or many other types of materials. A dust collection system is provided having dust pickups 28 located above the conveyor belt 16 upstream and downstream of the chute 14. As shown in FIG. 2, the edges of the conveyor belt 16 are supported between the idler rollers 20 by an edge support 30. A preferred edge support 30 is the GUARDASEAL sealing support system, U.S. Pat. No. 4,874,082, as manufactured by Martin Engineering Company of Neponset, Ill.

As shown in FIGS. 1 and 2, a series of supports 34A-M are attached to the stringers 22 at each side of the conveyor mechanism 12. Each support 34A-M includes a vertical strut 36 having a first end 38 attached to a stringer 22 and a second end 40. A bracket 42 has a first end 44 and a second end 46 which is attached to the second end 40 of the vertical strut 36. The vertical strut 36 and the bracket 42 are attached to one another at approximately a right angle. A gusset plate 48 including an aperture 50 is attached to each vertical strut 36 and bracket 42.

The feed chute 14 includes a front wall 54, a rear wall 56 and two side walls 58. An angle 60 is attached to and extends between the first ends 44 of bracket 42 of each support 34A-M. In the load zone area 26 the angles 60 are also attached to the side walls 58 of the chute 14. Outside of the load zone area 26, dust cover plates 62 extend between and are attached to the angles 60 on each side of the conveyor belt mechanism 12. The dust cover plates 62 create a seal between the angles 60 to prevent the escape of any dust generated from the loading of the conveyed material.

As shown in FIG. 2 a modular unit 64 is fastened to the angle 60 and extends downwardly therefrom to the edge of the conveyor belt 16. As shown in FIG. 8, the modular unit 64 includes an essentially rectangular frame 66 having an upper angle 68 with a horizontal leg 70 and a vertical leg 72. The horizontal leg 70 includes slotted apertures 73 and the vertical leg 72 includes apertures 77. The upper angle 68 has a first end 74 and a second end 76. An angle 78 having a first leg 80 and a second leg 82 extends downwardly from each end 74 and 76 of the upper angle 68 at a right angle. The second leg 82 of each angle 78 terminates in an edge 84. The first leg 80 of each angle 78 terminates in a sloped edge 86 which extends at approximately a 55° angle downward from horizontal. The sloped edge 86 extends downwardly beginning at the edge 84 of the second leg 82. The second leg 82 of angle 78 contains an aperture 88. The first leg 80 of the angle 78 includes an upper aperture 90 and a lower aperture 92. While angles other than 55° may be used for the sloped edge 86, a 55° angle is preferably used in connection with a belt 16 having 35° sloped edges so that sloped edge 86 will be perpendicular with the edge of the belt 16. Where the edge of the belt 16 slopes at angles other than 35°, the angle of the sloped edge 86 should be changed so as to remain perpendicular with the edge of the belt 16.

A bent plate 94 includes a vertical upper portion 96 and a lower portion 98 bent at approximately 35° from the upper portion 96 so that the lower portion 98 is aligned with the sloped edges 86 of the angles 78 and perpendicular to the edge of the belt 16. The bent plate 94 includes a pair of notched areas defined by edges 100 and 102. The lower portion 98 of bent plate 94 is attached at each end to the sloped edge 86 of each angle 78 with edge 100 connected to edge 84 of angle 78. The upper portion 96 of the bent plate 94 extends between the second legs 82 of the angles 78 with edge 102 attached thereto. The upper portion 96 of bent plate 94 includes apertures 104. The lower portion 98 of the bent plate 94 contains apertures 106.

A stiffener 108 is attached at one end to angle 68 and at the other end to the upper portion 96 and the lower portion 98 of the bent plate 94. A stiffener 108 is placed at one-third points of the upper angle 68. Each stiffener 108 includes an aperture 110. The apertures 90 of the first legs 80 are axially aligned with the apertures 110 in the stiffeners 108.

A backing plate 112 extends between and is attached to the edge of the first leg 80 of each angle 78, to the bottom edge 113 of the lower portion 98 of the bent plate 94, and to the stiffeners 108. The backing plate 112 extends from the bottom edge 113 of the bent plate 94 upward to an upper edge 114 which is a short distance below the edge of the vertical leg 72 of angle 68. The backing plate 112 includes apertures 116. A threaded nut 118 is attached to the outside surface of the backing plate 112 concentric with each aperture 116. The backing plate 112 also includes access holes 120 which provide access to the apertures 88, 104 and 106.

As shown in FIG. 2, a wear liner plate 122 having an upper portion 124 and a lower portion 126 which is disposed at approximately a 35° angle from the upper portion 124 is removably fastened to the frame 66. This 35° angle is used so that the lower portion 126 will be perpendicular to the edge of the belt 16 which is sloped upwardly at 35°. When the edge of the belt 16 is sloped at another angle, the angle of the lower portion 126 should be changed correspondingly to remain perpendicular to the edge of the belt 16. A preferred wear liner is made of T1 steel. The wear liner 122 includes countersunk apertures 128 which align with apertures 77, 88, 104 and 106 of the frame 66. The wear liner 122 is fastened to the frame 66 by countersunk fasteners 130. The wear liner 122 may be composed of one or more individual plates and may be of various thicknesses as desired.

The modular unit 64 is releasably fastened to the horizontal leg of angle 60 by fasteners 134 which extend through the slotted apertures 73 of the upper angle 68 of the module 64. Vertical adjustment of the modular unit 64 may be obtained by use of various numbers and thicknesses of shims 136 so as to maintain a consistent gap between the modular unit 64 and the belt 16. A ¼ inch gap at the load zone 26 increasing to ⅜ inch at the exit of the sealing system 10 is preferred.

The gap between the lower edge of the modular unit 64 and the conveyor belt 16 is sealed by an adjustable conveyor belt skirt seal 138. A preferred skirt seal is the DURT SEAL skirt sealing system, U.S. Pat. No. 4,898,272, as manufactured by Martin Engineering Company of Neponset, Ill. The skirt seal 138 includes a rubber skirt 140 having its lower edge in contact with the conveyor belt 16. The skirt 140 is clamped against the backing plate 112 of the modular unit 64 by a plurality of clamps 142. The clamps 142 are threadably fastened to respective nuts 118.

One or more adjustable stiffeners 144 may be attached between the modular unit 64 and the supports 34A-M. As shown in FIG. 3, the adjustable stiffener 144 includes an internally threaded pipe 146 having a first end 148 and a second end 150. A threaded rod 152 having a plate 154 with an aperture 156 attached at one end is threadably inserted into each end 148 and 150 of the pipe 146. One end of the adjustable stiffener 144 is releasably fastened to the gusset plate 48 of a support 34 through apertures 156 and 50. The other end of the adjustable stiffener 144 is releasably fastened to the module 64 through aperture 156 and either aperture 90 in angle 78 or through aperture 110 in stiffener 108 depending on whether the support 34 is located adjacent to a stiffener 108 or an angle 78 of the frame 66.

Alternative embodiments of the modular unit 64 are shown in FIGS. 4 and 5. FIG. 4 shows a planar modular unit 158 having a frame 160 with an upper angle 162, a lower angle 164 and two end angles 166 (only one shown). The upper angle 162 includes slotted apertures 168 in the horizontal leg and apertures 170 in the vertical leg. The lower angle 164 includes apertures 172. The end angles 166 include an upper aperture 174 and a lower aperture 176. Two stiffeners 177 each having an aperture 179 are attached between the upper angle 162 and the lower angle 164 at the one-third points of the modular unit 158. A backing plate 178 having access holes 181 located as in module 64 and apertures 183 is attached to the lower angle 164, the end angles 166 and the stiffeners 177. The apertures 174 in the end angles 166 are aligned concentrically with the apertures 179 of the stiffeners 177. A planar wear liner 180 having countersunk apertures 182 is removably fastened to the frame 160 by countersunk fasteners 184. Nuts 185 are attached to the backing plate 178 concentrically with apertures 183.

As shown in FIG. 5, an inwardly deflecting modular unit 186 includes a frame 188 with an upper angle 190, a lower angle 192 and two end angles 194 (only one shown). An angle 196 has each of its toes attached to the vertical leg 197 of the lower angle 192. The frame 188 also includes two stiffeners 189 located at one-third points along the length of the module 186 and extending between the upper angle 190 and the lower angle 192. The stiffeners 189 each include an aperture 191. The end angles 194 include an upper aperture 193 and a lower aperture 195. The apertures 191 and 193 are aligned axially with one another. A backing plate 198 having access holes 199 is attached to the frame 188 extending between the end angles 194 and being attached to the stiffeners 189 and the lower angle 192. Nuts 200 are attached to the backing plate 198 concentrically with apertures 201. An inwardly deflecting wear liner 202 is removably fastened to the frame 188 with countersunk fasteners 184.

FIG. 6 shows a modular ventilator unit 203 in connection with a skirt sealing system 138 and a conveyor belt 16. Ventilator module 203 includes a frame 204 which is constructed in a manner similar to frame 66 as shown in FIG. 8. Frame 204 includes an upper angle 205, a bent plate 206 and two end angles 207. Bent plate 206 is bent at an approximate angle of 35° This 35° angle relates as before to the angle at which the edge of the belt 16 is sloped, to place the lower portion of the bent plate 106 perpendicular to the belt 16. Each end angle 207 includes an upper aperture 208 and a lower aperture 209. Two stiffeners 210 extend between the upper angle 205 and the bent plate 206. Each stiffener 210 is located at a one-third point of the angle 205. The stiffeners 210 each include an aperture 211 which is axially aligned with the apertures 208 in the end angles 207. The horizontal leg of the angle 205 includes slotted apertures 212. A backing plate 213 is attached to the end angles 207, the stiffeners 210 and the bottom of the bent plate 206. The backing plate 213 includes apertures 214 and access holes 215 located as shown on cover plate 112. A nut 216 is located on backing plate 213 concentrically with each aperture 214.

An inner liner 217 is attached to the frame 204 and extends between the upper angle 205, the bent plate 206 and the end angles 207. Spacers 218 each including an aperture 219 are attached to the inner liner 217. A wear liner 220 having countersunk apertures 221 is removably fastened to the frame 204 by countersunk fasteners 222. The spacers 218 create a passageway 223 between the inner liner 217 and the wear liner 220 extending from the bottom of the modular unit 203 to the top of the unit 203. As can be seen in FIG. 6 a gap is left between the wall of the dust pickup 28 and the top of the wear liner 220.

Frame 204 differs from frame 66 in that it is narrower than frame 66 to compensate for the thickness of the inner liner 217 and the spacers 218. Ventilator module 203 may also be configured with a planar wear liner as modular unit 158 or with an inwardly deflecting wear liner as modular unit 186.

FIGS. 9 and 10 show a deflector mechanism 224 which may be attached to the feed chute 14 on one or both of the side walls 58. The deflector mechanism 224 includes a frame 225 having an upper V-shaped bent plate 226 having a vertical leg 228 and a sloped leg 230. The vertical leg 228 is fastened to the chute wall 58 through apertures 232. The sloped leg 230 includes three slotted apertures 234 and three slotted apertures 236. Stiffeners 237 are located between the legs 228 and 230.

A lower V-shaped bent plate 238 having a horizontal leg 240 and a sloped leg 242 is connected to the upper V-shaped bent plate 226 by angles 244 at the ends of the upper and lower bent plates 226 and 238. The horizontal leg 240 includes apertures 246 which allow any of the modules 64, 158, 186 or 203 to be fastened to the deflector mechanism 224. The sloped leg 230 and the sloped leg 242 are spaced apart from one another to allow the wear plate 248, preferably made of T-1 steel to slide therebetween. The wear plate 248 includes three apertures 250 which will respectively align with the apertures 234 or 236 as desired. The wear plate 248 also has two U-shaped handles 252 attached thereto. Stiffeners 254 are located between the legs 240 and 242 of the lower V-shaped bent plate 238.

As shown in FIG. 1 a modular unit A extends between supports 34A to 34D on each side of the conveyor belt 16. A modular unit B extends between supports 34D and 34G, a modular unit C extends between supports 34G and 34J and a modular unit D extends between supports 34J and 34M on each side of the conveyor belt 16. Preferably the modular units A and D will be ventilator modules 203 and modules B and C will each be one of the modular units 64, 158 or 186. However, each modular unit A-D may be any one of the modular units 64, 158, 186 or 203.

Although FIG. 1 shows supports 34A-M some of which are located at the end of each modular unit and others at the one-third points of the modules, fewer supports may be used if conditions allow. The angle 60 which is attached to the end of the supports 34 may be welded directly to the side walls 58 of chute 14. Alternatively where a deflector mechanism 224 is used, the ends 44 of the supports 34 may be welded or bolted to the stiffeners 254 of the lower V-shaped bent plate 238.

One or more modular units 64, 158, 186 or 203 are releasably fastened to the angle 60 of the supports 34A-M on each side of the conveyor belt 16. If a deflector mechanism 224 is being utilized the modules will be fastened to the horizontal leg 240 of the deflector mechanism 224. Each modular unit 64, 158, 186 and 203 may also be releasably fastened to an adjacent modular unit 64, 158, 186 or 203 or other stationary structure at each end of the modular unit through the apertures 90, 92, 174, 176, 193, 195, 208 and 209 in each end angle 78, 166, 194 and 207 of the modular units 64, 158, 186 and 203. Various thicknesses of shims 136 may be inserted between the modular units and the angle 60 or the horizontal leg 240 of the deflector mechanism 224 to adjust the vertical position of the modular units so that there is an appropriately sized gap between the lower end of the module and the surface of the conveyor belt 16. This gap is sealed by the skirt seal 138.

Adjustable stiffeners 144 may then be connected as desired between the supports 34A-M and the modular units 64, 158, 186 and 203. The adjustable stiffeners 144 may be connected to either the stiffeners or the end angles of the modules. The wear liners 122, 180, 202 and 220 of the modules may be further aligned by rotating the pipe 146 in one direction or the other so as to lengthen or shorten the adjustable stiffener 144.

As a stream of conveyed material is being loaded onto the conveyor belt 16 the deflector plate 248 may be inserted into the chute 14 various distances to deflect the stream of material to the center line of the conveyor belt 16. The deflector plate may be fully inserted as shown in solid in FIG. 10 or may be retracted various amounts as shown in phantom by inserting bolts through either slots 234 or 236 and into apertures 250 of the wear plate 248.

When a wear plate on one of the modular units becomes worn past acceptable limits and requires replacement, the conveyor belt 16 may be temporarily shut down. The adjustable stiffeners 144 and the skirt seal 138 which are connected to this modular unit are removed and the fasteners 134 which extend through the upper angle 68 and the angle 60 are removed. Each end of the worn module is also unfastened from any adjacent modules or other stationary structures. The entire modular unit 64, 158, 186 or 203 may then be removed from the conveyor belt sealing system 10 and the conveyor mechanism 12. A second modular unit 64, 158, 186 or 203 may then be reinserted in the removed module's place and refastened into position. The adjustable stiffeners 144 are then reattached as is the skirt seal 138. All of the aforementioned actions may be done from the exterior of the conveyor belt sealing system 10. The conveyor mechanism 12 may then be restarted. It is possible to conduct this replacement procedure with the conveyor in operation although it is not suggested for safety reasons.

The removal and replacement of a modular unit may be done in a short period of time requiring a short down time for the conveyor mechanism 12. Once removed, the worn wear plate on the removed module may be unfastened and replaced with new wear plates. This refurbished module may then be used to replace the next module that requires replacement. As each modular unit 64, 158, 186 and 203 is of the same width and includes the same hole patterns, any one modular unit 64, 158, 186 or 203 may be replaced by any other modular unit 64, 158, 186 or 203.

When a ventilator module 203 is being utilized, the dust which is formed at the surface of the conveyor belt 16 and which would normally try to escape between the rubber skirt 140 and the conveyor belt 16 will be directed up through the passageway 223 of the module 203 as shown by the arrows D. The dust will then leave the passageway 223 at the top of the module 203 whereupon it may be collected by the dust pickups 28.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A modular conveyor belt sealing assembly with a plurality of modular units mounted adjacent to an edge of said conveyor belt, each modular unit including:
   a frame having an interior side facing towards the center of said conveyor belt, said interior side including a flat surface extending parallel to the direction of conveyor belt travel, said flat surface extending substantially the entire length of said unit and an exterior side, facing away from the center of said conveyor belt;
   a linearly extending wear liner fastened to said frame on said interior side, said wear liner positioned to be overlying and adjacent said flat surface of said interior side;
   first attachment means for removably securing each said modular unit adjacent an edge of said conveyor belt; and
   second attachment means for removably securing each said modular unit in adjacent alignment with said other modular units, said first and second attachment means facilitating individual removal and replacement of any modular unit of said conveyor belt sealing assembly, each said modular unit of said conveyor belt sealing assembly being interchangeable with other said units.

2. A modular conveyor belt sealing assembly as in claim 1 wherein said attachment means are operable from the exterior of said modular units allowing the removal and replacement of said modular units from the exterior of said sealing assembly.

3. The modular conveyor belt sealing assembly of claim I wherein said wear liners are removably fastened to said modular units.

4. The modular conveyor belt sealing assembly of claim 1 wherein one or more modules include wear liners which are planar.

5. The modular conveyor belt sealing assembly of claim 1 wherein one or more modules include wear liners forming an upper planar portion and an inwardly deflecting lower portion.

6. The modular conveyor belt sealing assembly of claim 1 wherein one o more modules include wear liners forming an upper planar portion and an outwardly extending lower portion.

7. The modular conveyor belt sealing assembly of claim I wherein one or more modular units additionally include:
   an inner liner attached to said frame and located on the interior side of said frame between said frame and said wear liner, said wear liner being spaced apart from said inner liner so as to define a passageway therebetween having an inlet adjacent said conveyor belt edge and an outlet in connection with a source of fluid pressure.

8. The modular conveyor belt sealing assembly of claim 1 additionally including adjustable deflector means having:
   a frame defining a slot; and
   a deflector plate slidably located within said slot, said deflector plate being adjustably movable beyond the interior surface of said modular units various distances as desired.

9. A modular unit for use in a conveyor belt sealing assembly, said modular unit including:
   a frame having an interior side facing towards the center of said conveyor belt, said interior side including a flat surface extending parallel to the direction of conveyor belt travel, said flat surface extending substantially the entire length of said unit and an exterior side facing away from the center of said conveyor belt;
   a linearly extending wear liner fastened to said frame on said interior side, said wear liner positioned to be overlying and adjacent said flat surface of said interior side;
   first attachment means for removably securing said modular unit adjacent an edge of said conveyor belt; and
   second attachment means for removably securing said modular unit in adjacent alignment with other modular units, said first and second attachment means facilitating removal and replacement of said modular unit.

10. A modular unit as in claim 9 wherein said attachment means are operable from the exterior of said modular unit, allowing the removal and replacement of said modular unit from the exterior of said sealing assembly.

11. The modular unit of claim 9 wherein said wear liner is removably fastened to said frame.

12. The modular unit of claim 9 wherein said wear liner is planar.

13. The modular unit of claim 9 wherein said wear liner forms an upper planar portion and an inwardly deflecting lower portion.

14. The modular unit of claim 9 wherein said wear liner forms an upper planar portion and an outwardly extending lower portion.

15. The modular unit of claim 9 additionally including:
   an inner liner attached to said frame and located on the interior side of said frame between said frame and said wear liner, said wear liner being spaced apart from said inner liner so as to define a passageway therebetween having an inlet adjacent said conveyor belt edge and an outlet in connection with a source of fluid pressure.

16. The modular unit of claim 9 wherein said wear liner is removably fastened to said frame.

17. The modular unit of claim 9 additionally including an adjustable stiffener for bracing and aligning said module, said stiffener including:

an internally threaded sleeve having a first end and a second end;

a first threaded rod having first and second ends with said first end being threadably fastened to said first end of said sleeve;

a second threaded rod having first and second ends with said first end being threadably fastened to said second end of said sleeve;

a plate attached to the second end of each said rod, each said plate including an aperture, one of said plates being secured to said modular unit.

18. An adjustable deflector mechanism for use with a conveyor belt, said deflector mechanism including:

a frame mounted above said conveyor belt, said frame having an interior side and an exterior side and defining a slot which extends from said exterior side to said interior side of said frame; and a deflector plate slidably located within and extending from said slot, said deflector plate being adjustably movable beyond the interior side of said frame various distances as desired.

* * * * *

UNITED STATES PATENT AND TRADEMARK OFFICE
CERTIFICATE OF CORRECTION

PATENT NO. : 5,048,669

DATED : September 17, 1991

INVENTOR(S) : Robert T. Swinderman

It is certified that error appears in the above-identified patent and that said Letters Patent is hereby corrected as shown below:

Please add columns 7 and 8 as per attached page.

Signed and Sealed this

Eighteenth Day of February, 1992

Attest:

HARRY F. MANBECK, JR.

*Attesting Officer*   *Commissioner of Patents and Trademarks* plate 106 perpendicular to the belt 16. Each end angle 207 includes an upper aperture 208 and a lower aperture 209. Two stiffeners 210 extend between the upper angle 205 and the bent plate 206. Each stiffener 210 is located at a one-third point of the angle 205. The stiffeners 210 each include an aperture 211 which is axially aligned with the apertures 208 in the end angles 207. The horizontal leg of the angle 205 includes slotted apertures 212. A backing plate 213 is attached to the end angles 207, the stiffeners 210 and the bottom of the bent plate 206. The backing plate 213 includes apertures 214 and access holes 215 located as shown on cover plate 112. A nut 216 is located on backing plate 213 concentrically with each aperture 214.

An inner liner 217 is attached to the frame 204 and extends between the upper angle 205, the bent plate 206 and the end angles 207. Spacers 218 each including an aperture 219 are attached to the inner liner 217. A wear liner 220 having countersunk apertures 221 is removably fastened to the frame 204 by countersunk fasteners 222. The spacers 218 create a passageway 223 between the inner liner 217 and the wear liner 220 extending from the bottom of the modular unit 203 to the top of the unit 203. As can be seen in FIG. 6 a gap is left between the wall of the dust pickup 28 and the top of the wear liner 220.

Frame 204 differs from frame 66 in that it is narrower than frame 66 to compensate for the thickness of the inner liner 217 and the spacers 218. Ventilator module 203 may also be configured with a planar wear liner as modular unit 158 or with an inwardly deflecting wear liner as modular unit 186.

FIGS. 9 and 10 show a deflector mechanism 224 which may be attached to the feed chute 14 on one or both of the side walls 58. The deflector mechanism 224 includes a frame 225 having an upper V-shaped bent plate 226 having a vertical leg 228 and a sloped leg 230. The vertical leg 228 is fastened to the chute wall 58 through apertures 232. The sloped leg 230 includes three slotted apertures 234 and three slotted apertures 236. Stiffeners 237 are located between the legs 228 and 230.

A lower V-shaped bent plate 238 having a horizontal leg 240 and a sloped leg 242 is connected to the upper V-shaped bent plate 226 by angles 244 at the ends of the upper and lower bent plates 226 and 238. The horizontal leg 240 includes apertures 246 which allow any of the modules 64, 158, 186 or 203 to be fastened to the deflector mechanism 224. The sloped leg 230 and the sloped leg 242 are spaced apart from one another to allow the wear plate 248, preferably made of T-1 steel to slide therebetween. The wear plate 248 includes three apertures 250 which will respectively align with the apertures 234 or 236 as desired. The wear plate 248 also has two U-shaped handles 252 attached thereto. Stiffeners 254 are located between the legs 240 and 242 of the lower V-shaped bent plate 238.

As shown in FIG. 1 a modular unit A extends between supports 34A to 34D on each side of the conveyor belt 16. A modular unit B extends between supports 34D and 34G, a modular unit C extends between supports 34G and 34J and a modular unit D extends between supports 34J and 34M on each side of the conveyor belt 16. Preferably the modular units A and D will be ventilator modules 203 and modules B and C will each be one of the modular units 64, 158 or 186. However, each modular unit A-D may be any one of the modular units 64, 158, 186 or 203.

Although FIG. 1 shows supports 34A-M some of which are located at the end of each modular unit and others at the one-third points of the modules, fewer supports may be used if conditions allow. The angle 60 which is attached to the end of the supports 34 may be welded directly to the side walls 58 of chute 14. Alternatively where a deflector mechanism 224 is used, the ends 44 of the supports 34 may be welded or bolted to the stiffeners 254 of the lower V-shaped bent plate 238.

One or more modular units 64, 158, 186 or 203 are releasably fastened to the angle 60 of the supports 34A-M on each side of the conveyor belt 16. If a deflector mechanism 224 is being utilized the modules will be fastened to the horizontal leg 240 of the deflector mechanism 224. Each modular unit 64, 158, 186 and 203 may also be releasably fastened to an adjacent modular unit 64, 158, 186 or 203 or other stationary structure at each end of the modular unit through the apertures 90, 92, 174, 176, 193, 195, 208 and 209 in each end angle 78, 166, 194 and 207 of the modular units 64, 158, 186 and 203. Various thicknesses of shims 136 may be inserted between the modular units and the angle 60 or the horizontal leg 240 of the deflector mechanism 224 to adjust the vertical position of the modular units so that there is an appropriately sized gap between the lower end of the module and the surface of the conveyor belt 16. This gap is sealed by the skirt seal 138.

Adjustable stiffeners 144 may then be connected as desired between the supports 34A-M and the modular units 64, 158, 186 and 203. The adjustable stiffeners 144 may be connected to either the stiffeners or the end angles of the modules. The wear liners 122, 180, 202 and 220 of the modules may be further aligned by rotating the pipe 146 in one direction or the other so as to lengthen or shorten the adjustable stiffener 144.

As a stream of conveyed material is being loaded onto the conveyor belt 16 the deflector plate 248 may be inserted into the chute 14 various distances to deflect the stream of material to the center line of the conveyor belt 16. The deflector plate may be fully inserted as shown in solid in FIG. 10 or may be retracted various amounts as shown in phantom by inserting bolts through either slots 234 or 236 and into apertures 250 of the wear plate 248.

When a wear plate on one of the modular units becomes worn past acceptable limits and requires replacement, the conveyor belt 16 may be temporarily shut down. The adjustable stiffeners 144 and the skirt seal 138 which are connected to this modular unit are removed and the fasteners 134 which extend through the upper angle 68 and the angle 60 are removed. Each end of the worn module is also unfastened from any adjacent modules or other stationary structures. The entire modular unit 64, 158, 186 or 203 may then be removed from the conveyor belt sealing system 10 and the conveyor mechanism 12. A second modular unit 64, 158, 186 or 203 may then be reinserted in the removed module's place and refastened into position. The adjustable stiffeners 144 are then reattached as is the skirt seal 138. All of the aforementioned actions may be done from the exterior of the conveyor belt sealing system 10. The conveyor mechanism 12 may then be restarted. It is possible to conduct this replacement procedure with the conveyor in operation although it is not suggested for safety reasons.

The removal and replacement of a modular unit may be done in a short period of time requiring a short down time for the conveyor mechanism 12. Once removed,